(12) United States Patent
Kunimi

(10) Patent No.: US 6,408,675 B1
(45) Date of Patent: Jun. 25, 2002

(54) ECCENTRIC ERROR CORRECTOR AND METHOD OF ECCENTRIC ERROR CORRECTION FOR ACCELERATION SENSOR IN ACCELERATION GENERATING APPARATUS

(75) Inventor: Takashi Kunimi, Saitama (JP)

(73) Assignees: Akebono Research & Development Centre Ltd., Saitama; Akebono Brake Industry Co., Ltd., Tokyo, both of (JP)

( * ) Notice: Subject to any disclaimer, the term of this patent is extended or adjusted under 35 U.S.C. 154(b) by 0 days.

(21) Appl. No.: 09/487,224

(22) Filed: Jan. 19, 2000

(30) Foreign Application Priority Data

Jan. 19, 1999 (JP) .......................................... 11-010253

(51) Int. Cl.[7] .................................................. G01P 3/16

(52) U.S. Cl. ...................................................... 73/1.37

(58) Field of Search ................................. 73/1.37, 1.35, 73/514.02, 514.04

(56) References Cited

U.S. PATENT DOCUMENTS 5,353,642 A * 10/1994 Hasegawa et al. ....... 73/514.15

FOREIGN PATENT DOCUMENTS

JP 7-110342 4/1995

* cited by examiner

Primary Examiner—Robert Raevis
(74) Attorney, Agent, or Firm—Morgan, Lewis & Bockius LLP

(57) ABSTRACT

An eccentric error corrector for a rotary-type acceleration generating apparatus. The eccentric error corrector includes a large-diameter turntable and a small-diameter turntable. The large-diameter turntable is rotated by a first servo motor. The small-diameter turntable is mounted on the outer periphery portion of the large-diameter turntable and rotatable by a second servo motor, in which an acceleration sensor is attachable to the small-diameter turntable. The eccentric error corrector includes a DC-component remover removing only the DC component from an output signal of the acceleration sensor attached on the small-diameter turntable.

3 Claims, 7 Drawing Sheets

ROTATIONAL ANGLE OF SUBTURNTABLE [ rad ]

CENTER OF GRAVITY ON SENSITIVITY
AXIS OF ACCELERATION SENSOR

ROTATIONAL ANGLE OF SUBTURNTABLE [ rad ]

CENTER OF GRAVITY ON SENSITIVITY
AXIS OF ACCELERATION SENSOR

ROTATIONAL ANGLE OF SUBTURNTABLE [ rad ]

ECCENTRIC ERROR CORRECTOR AND METHOD OF ECCENTRIC ERROR CORRECTION FOR ACCELERATION SENSOR IN ACCELERATION GENERATING APPARATUS

BACKGROUND OF THE INVENTION

1. Field of the Invention

The present invention relates to a turntable-type acceleration generating apparatus (rotary-type acceleration generating apparatus) which is suitable for examining characteristics of an acceleration sensor for sensing an acceleration. More particularly, the present invention relates to an eccentric error corrector for correcting an eccentric error of an acceleration sensor in a rotary acceleration generating apparatus, which the device can readily correct eccentricity between the center of gravity on the sensing axis of the acceleration sensor and the rotational center of the small-diameter turntable when an acceleration sensor is placed on a small-diameter turntable (small-diameter rotary member) in examining the sensor characteristics, and can simply and exactly measure the characteristics of the acceleration sensor regardless of quantity of the eccentricity, and a method of removing an eccentric error of an acceleration sensor in the rotary acceleration generating apparatus.

2. Description of the Related Art

Acceleration of an object moving in a three-dimensional space, e.g., robots and air planes, and another object moving in two-dimensional space, e.g., motor vehicles, are sensed by an acceleration sensor. Motions of the object or various devices installed on the object are controlled in accordance with the thus gathered data for intended purposes. Various types of acceleration sensors are currently used for this type of control. Therefore, it is necessary to know the characteristics of the acceleration sensors before the sensors are assembled into the control devices.

A vibration tester is currently used for examining the characteristics of the acceleration sensor. However, the examining method using the vibration tester has the following problems.

(1) The vibration tester examines an acceleration characteristic of an object to be examined in a manner that the object is located on a testing table and subjected to a reciprocative acceleration. Sometimes, the testing table somewhat slants during the reciprocative operation (vertical vibration) of the testing table. The table slanting makes it difficult to secure an exact reciprocative motion. Where the table slants, a force component is additionally applied to the acceleration sensor under test in the directions different from those of the reciprocative forces. The resultant of the measurement includes an interference component in addition to an acceleration of the sensor. The interference component contained in the measurement result impairs the examination of the characteristics of the acceleration sensor in examination exactness.

(2) In the above-mentioned vibration tester, the acceleration sensor is actually vibrated by a vibration generator. Therefore, the tester per se is inevitably large in scale. Further, it is necessary to actually apply a dynamic acceleration of the vibration to the acceleration sensor. This results in complexity of the testing procedure.

For this background, the inventors of the present Patent Application proposed the solution to the problems. The solution takes the form of a novel centrifugal acceleration tester (turntable-type acceleration generating apparatus) capable of remarkably improving the testing accuracy (Japanese Unexamined Patent Publication No. Hei. 7-110342). In the tester, an acceleration sensor is placed on a testing table, and a predetermined acceleration (i.e., a DC component of acceleration) is applied to it in a predetermined direction, whereby the characteristics of the acceleration sensor are examined with high precision.

In examining the characteristics of the acceleration sensor by use of the turntable acceleration generating apparatus, it is almost impossible, in practical use, to make the center of gravity on the sensitivity axis of the acceleration sensor as an object to be examined coincident with the rotational center of the small-diameter turntable. Accordingly, an eccentricity between the center of gravity on the sensitivity axis of the acceleration sensor and the rotational center of the small-diameter turntable inevitably gives rise to an error in an output signal of the acceleration sensor. Therefore, the error contained in output signal must be corrected with a various method.

In examining the characteristics of the commercially available acceleration sensor, it is very important to know the center of gravity on the sensitivity axis of the acceleration sensor. So far, there is no technique to exactly know the center of gravity on the sensitivity axis. For this reason, the characteristic output value of the acceleration sensor inevitably contains an error which is caused by the eccentricity of the center of gravity on the sensitivity axis, so that one cannot exactly know the characteristics of the acceleration sensor. The testing of the characteristic test of the acceleration sensor by use of the turntable-type acceleration generating apparatus is considerably easier than the testing which uses the conventional vibration type acceleration tester. However, the center of gravity on the sensitivity axis of the acceleration sensor accurately cannot be certainly made coincident with the rotational center of the small-diameter turntable. Thus, the conventional sensor characteristic testing is unsatisfactory in precisely knowing the characteristics of the acceleration sensor.

SUMMARY OF THE INVENTION

For the above-mentioned background, the inventor of the present Patent Application concentrated his energy on developing a technical method for removing the adverse effect by the eccentricity of the center of gravity on the sensitivity axis of the acceleration sensor. Through the study, it was found that a low frequency component indicating the characteristics proper to the acceleration sensor and a DC component (eccentric error component) which is caused by an eccentricity of the center of gravity on the sensitivity axis are contained in a superimposing fashion in the output signal that is output from the acceleration sensor when it is operated by use of the turntable-type acceleration generating apparatus.

The present invention has been made on the basis of the above-mentioned finding, and proposes an eccentric error corrector and method for correcting an eccentric error of the center of gravity on the sensitivity axis of an acceleration sensor set in a turntable-type acceleration generating apparatus. The eccentric error corrector is capable of correcting an eccentric error by removing the DC component even if the center of gravity on the sensitivity axis of an acceleration sensor is located at any eccentric position relative to the rotational center of a small-diameter turntable. Accordingly, this is an object of the present invention to solve the above-mentioned problems.

According to the present invention, even if the center of gravity on the sensitivity axis of an acceleration sensor is located at any eccentric position or at unknown position, one can proof the acceleration sensor and always know the exact characteristic of the acceleration sensor.

To solve the above problems, there is provided an eccentric error corrector for removing the effect by an eccentric error of an acceleration sensor, which the device is used in combination with a rotary acceleration generating apparatus having a large-diameter turntable rotated by a first servo motor and a small-diameter turntable which is mounted on an appropriate location on the outer periphery portion of the large-diameter turntable while being rotatable by a second servo motor, and allows an acceleration sensor to be attached thereto. The eccentric error corrector includes a DC-component remover which removes only the DC component from an output signal of an acceleration sensor placed on the small-diameter turntable.

In the eccentric error corrector, the DC component remover may be a high-pass filter.

The present invention also provides a method for removing the effect by an eccentric error of an acceleration sensor, which the method is used for a rotary acceleration generating apparatus having a large-diameter turntable rotated by a first servo motor and a small-diameter turntable which is mounted on an appropriate location on the outer periphery portion of the large-diameter turntable while being rotatable by a second servo motor, and allows an acceleration sensor to be attached thereto. The method includes the steps of: placing an acceleration sensor as an object to be inspected on the small-diameter turntable; and removing a low frequency component from an output signal of the acceleration sensor placed on the small-diameter turntable when the large- and small-diameter turntables are rotated, to thereby remove an error caused by an eccentricity of the center of gravity on the sensitivity axis of the acceleration sensor with respect to the rotational center of the small-diameter turntable.

DETAILED DESCRIPTION OF THE PREFERRED EMBODIMENTS

The preferred embodiment of the present invention will be described with reference to the accompanying drawings.

Figure 1:
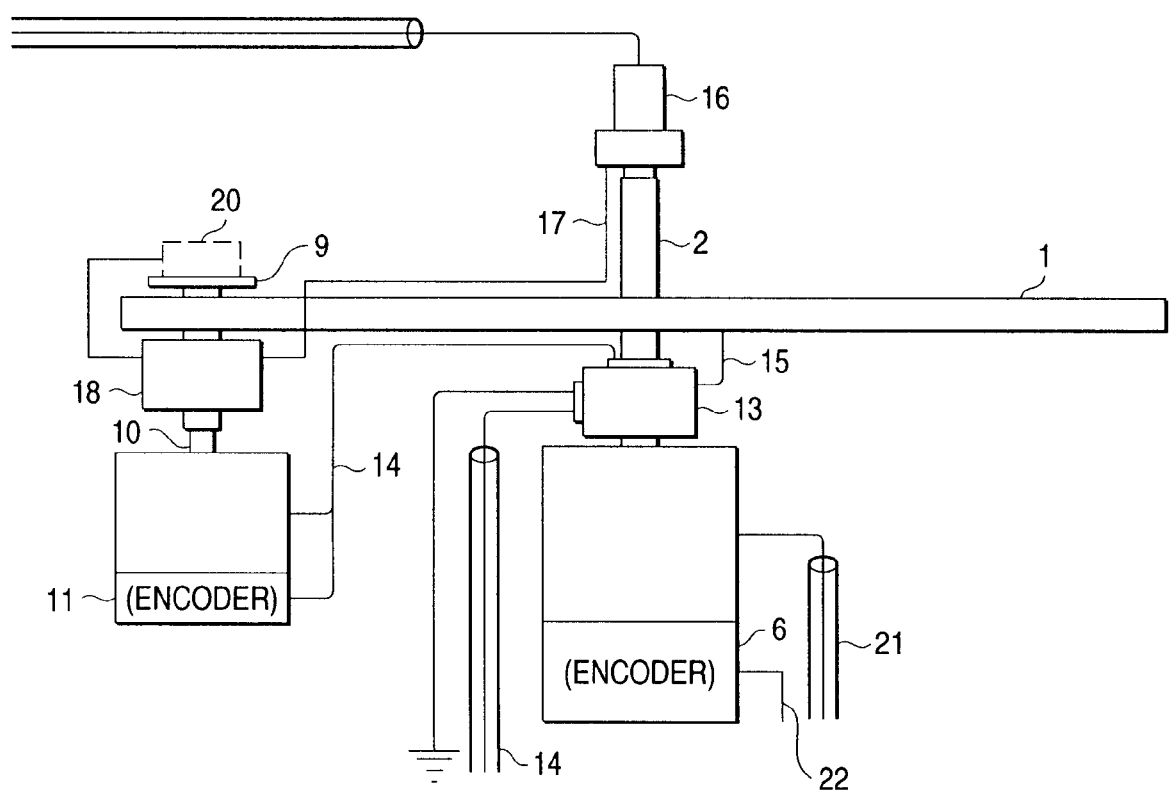
FIG. 1 is a side view schematically showing a turntable-type acceleration generating apparatus which is an embodiment of to the present invention.

FIG. 1 is a side view schematically showing a turntable acceleration generating apparatus as a rotary-type acceleration generating apparatus constructed according to the present invention.

An arrangement of the turntable acceleration generating apparatus to be used in the present invention will be described with reference to the accompanying drawings. In the figure, reference numeral 1 is a large-diameter turntable as a rotary member having an appropriate diameter, made of such nonmagnetic material as aluminum or copper. A rotary shaft 2 is fastened to the large-diameter turntable 1. The upper and lower ends of the rotary shaft 2 of the large-diameter turntable 1 are supported by bearings, which are provided on turntable support arms (not shown), such that the large-diameter turntable 1 is rotatable about the rotary shaft 2.

A servo motor 6 (referred to as a first servo motor 6), which has an encoder and is for driving the large-diameter turntable, is mounted on the rotary shaft 2. The first servo motor 6 is connected to a control device by way of a power line 21 and a control signal line 22. Therefore, when the first servo motor 6 is driven, the large-diameter turntable 1 is also rotated with respect to the turntable support arm.

A small-diameter turntable 9 as both a rotary member and a sensor table is rotatably supported at an appropriate position on the large-diameter turntable 1. An output shaft of a servo motor 11 (referred to as a second servo motor 11) for driving the small-diameter turntable is coupled with a rotary shaft 10 of the small-diameter turntable 9 such that the small-diameter turntable 9 is rotated when the second servo motor 11 is driven. Reference numeral 18 designates a third slip ring 18.

A balancer (not shown) is provided at a predetermined location of the large-diameter turntable 1. The balancer is well balanced with the weight of the small-diameter turntable 9 and the second servo motor 11 to thereby secure a rotation balance. With use of the balancer, the large-diameter turntable 1 may be rotated smoothly. Another balancer, if necessary, may be attached to the small-diameter turntable so as to secure its smooth rotation.

A first slip ring 13 is disposed at an appropriate position of the rotary shaft 2 of the large-diameter turntable 1, which is located under the large-diameter turntable 1. A power/control signal line 14 for supplying electric power to the second servo motor 11 and an earth line 15 of the large-diameter turntable 1 are connected to the first slip ring 13.

A second slip ring 16 is disposed at an appropriate position of the rotary shaft 2 above the large-diameter turntable 1. One end of a signal line 17 for deriving a signal from an acceleration sensor 20 placed on the small-diameter turntable 9 is connected to the second slip ring 16. The other end of the signal line 17 is connected to the third slip ring 18, which is provided on the rotary shaft of the small-diameter turntable 9.

With such an electrical connection, a signal output from the rotating acceleration sensor on the small-diameter turntable 9 may be measured by a measuring device located outside the apparatus, by way of the third slip ring 18 and the second slip ring 16 even if the small-diameter turntable 9 and the large-diameter turntable 1 are both rotating.

The turntable acceleration generating apparatus thus constructed will be operated in the following manner for testing an acceleration sensor to examine its characteristic.

1. An acceleration sensor 20 is fixed to the small-diameter turntable 9 on the large-diameter turntable 1.

2. The first servo motor 6 is driven to rotate the large-diameter turntable 1 to generate a centrifugal force. At the same time, the second servo motor 11 is driven to rotate the small-diameter turntable 9 to generate an acceleration at a given magnitude and in a predetermined direction. Under this condition, signals are derived from the acceleration sensor, and characteristics of the acceleration sensor are measured.

3. Electric power is supplied from the control device to the first servo motor 6 via the power line and the control signal line. Electric power, control signals and the like are supplied and applied from the control device to the second servo motor 11 through the first slip ring 13. Incidentally, the large-diameter turntable 1 is grounded through the first slip ring 13.

4. The signals that are derived from the acceleration sensor 20 are transmitted to the measuring device, through the third slip ring 18 provided on the rotary shaft of the small-diameter turntable 9, the signal line 17 located above the large-diameter turntable 1, and the second slip ring 16, whereby necessary data are gathered.

As described above, in measuring the sensor characteristics, it is difficult to make the center of gravity on the sensitivity axis of the acceleration sensor coincident with the rotational center of the small-diameter turntable. As a result, the output signal of the acceleration sensor contains a low frequency component representative of the characteristics proper to the acceleration sensor and a noise component caused by an eccentricity of the center of gravity on the sensitivity axis of the acceleration sensor. The presence of the noise component makes it difficult to precisely examine the characteristics of the acceleration sensor.

The inventor analyzed and theoretically considered the signal components of the output signal of the acceleration sensor on the turntable, and found that a DC component indicative of an eccentricity of the center of gravity on the sensitivity axis of the acceleration sensor is superimposed on a low frequency component indicative of the characteristics proper to the sensor in the output signal waveform. Further, it was confirmed that the characteristics of the acceleration sensor could exactly be measured by removing only the DC component.

The analyzing method of the output signal components of the acceleration sensor will be described with reference to FIG. 2.

Figure 2:
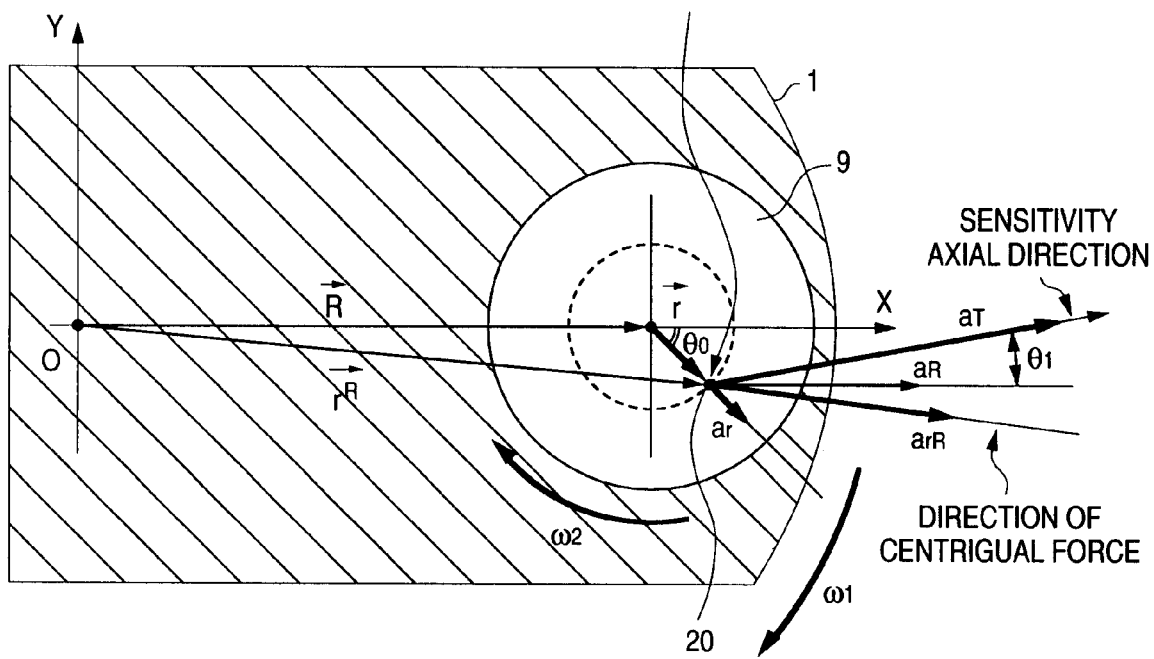
FIG. 2 is a vector diagram explaining an acceleration generated by the turntable-type acceleration generating apparatus.

In FIG. 2, reference numeral 1 designates a large-diameter turntable (referred to as a main turntable); 9 is a small-diameter turntable (referred to as a subturntable); and 20 is an acceleration sensor as an object to be inspected.

In a coordinate system XY illustrated in the figure, is defined an origin represents a position where the rotary shaft of the main turntable 1 stands erect, an X-axis represents the direction to the rotary shaft of the subturntable 9, and a Y-axis is perpendicular to the X-axis. In the figure, R indicates a distance from the origin of the coordinate system to the rotary shaft of the subturntable 9. The main turntable 1 and the subturntable 9 rotate at angular velocities $\omega_1$ and $\omega_2$ in the clockwise direction. The center of gravity on the sensitivity axis of the acceleration sensor 20 is positioned away from the rotational center of the subturntable 9 by a distance $\vec{r}$.

Before those turntables are rotated, the sensitivity axis of the acceleration sensor is parallel to the X-axis. An eccentric angle produced when the sensitivity axis is not perfectly coincident with the X-axis is assumed to be $\theta_1$. An angle of the X-axis with respect to a vector $\vec{r}$ before both the turntables rotate is assumed to be $\theta_0$.

Let us consider an acceleration generated by the rotating main turntable 1. A coordinate vector $\vec{r}^R$ of the center of gravity on the sensitivity axis of the acceleration sensor is given by $$\vec{r}^R = \vec{R} + \vec{r} \qquad [\text{Formula 1}]$$

A centripetal acceleration vector $\vec{a_{,R}}$, caused by the angular velocity $\omega_1$ of the main turntable 1, which acts on the vector $\vec{r}^R$ is given by $$\begin{aligned}\vec{a_{,R}} &= \vec{\omega_1} \times (\vec{\omega_1} \times \vec{r}^R) & [\text{Formula 2}]\\ &= -\omega_1^2 \vec{r}^R \\ &= -\omega_1^2 (\vec{R} + \vec{r}) \\ &= -\omega_1^2 \vec{R} - \omega_1^2 \vec{r}\end{aligned}$$

Assuming that the magnitudes of accelerations acting on the vector $\vec{R}$ and the vector $\vec{r}$ are $\alpha_R$ and $\alpha_r$, then those vectors are $$\alpha_R = \omega_1^2 R$$

$$\alpha_r = \omega_1^2 r \qquad [\text{Formula 3}]$$

If the subturntable 9 rotates at $\omega_2$, the components $\alpha_{R0}$ and $\alpha_{r0}$ acting in the sensitivity axial direction of the acceleration sensor, which act on the vector $\vec{R}$ and the vector $\vec{r}$, are $$\alpha_{R0} = \omega_1^2 R \cos(\omega_2 t - \theta_1)$$

$$\alpha_{r0} = \omega_1^2 r \cos(\theta_0 + \theta_1)(\text{constant value}) \qquad [\text{Formula 4}]$$

The component $\alpha_{r0}$ of the acceleration in the sensitivity axial direction acting on the vector $\vec{r}$ is a constant value, and this teaches that a DC component is added to the output signal of the acceleration sensor in case where no eccentricity is present.

From the above discussion, it is seen that the total acceleration component $\alpha_{Tm}$ produced in the direction of the sensitivity axis of the acceleration sensor when the main turntable 1 is rotated is as described below.

In a case where before the subturntable 9 is rotated, the center of gravity on the sensitivity axis of the acceleration sensor which is placed at a position in a plane on the right side of a straight line which passes through the rotary shaft of the subturntable 9 and is parallel to the Y-axis, an acceleration $\alpha_r$ by the vector $\vec{r}$ acts in the positive direction of the sensitivity axis of the acceleration sensor, and it is expressed by $$\alpha_{Tm} = \alpha_{R0} + \alpha_{r0} \quad [\text{Formula 5}]$$

When it is placed at a position in a plane on the left side of the straight line, an acceleration $\alpha_r$ by the vector $\vec{r}$ acts in the negative sensitivity axial direction of the acceleration sensor and it is expressed by $$a_{Tm} = a_{R0} - a_{r0}$$
$$= \omega_1^2 R\cos(\omega_2 t - \theta_1) - a_{r0}(\text{DC component})$$

<Acceleration Generated by Rotation of the Subturntable 9>

When the center of gravity on the sensitivity axis of the acceleration sensor is eccentric, a centripetal acceleration is generated by the rotation of the subturntable 9, and it is added as a component having the sensitivity axial direction of the acceleration sensor. A centripetal acceleration $\alpha\omega_2$ that is generated by the rotation of the subturntable 9 is given by $$\vec{a_{\omega_2}} = \vec{\omega_2} \times (\vec{\omega_2} \times \vec{r}) \quad [\text{Formula 7}]$$
$$= -\omega_2^2 \vec{r}$$

A magnitude of the centripetal acceleration is given by $$\alpha_{\omega_2} = \omega_2^2 r \quad [\text{Formula 8}]$$

A component $\alpha\omega_{20}$ in the direction of the sensitivity axis of the acceleration sensor is expressed by $$\alpha_{\omega_{20}} = \omega_2^2 r \cos(\theta_0 + \theta_1) \quad [\text{Formula 9}]$$

This component of the acceleration can be dealt as in the case of $\alpha_{r0}$. That is, if the center of gravity on the sensitivity axis of the acceleration sensor is placed on the right side in the plane, the acceleration acts in the positive sensitivity axial direction. On the other hand, if the center of gravity on the sensitivity axis of the acceleration sensor is placed on the left side in the plane, the acceleration acts in the negative sensitivity axial direction.

<Total Acceleration>

From the above discussion, a total acceleration component $\alpha_T$ in the sensitivity axial direction of the acceleration sensor may be described as hereunder.

a) When the center of gravity on the sensitivity axis of the acceleration sensor is placed in a plane on the right side of a straight line which passes through the rotary shaft of the subturntable 9 and is parallel to the Y-axis, the total acceleration component $\alpha_T$ is given by $$\alpha_T = \omega_1^2 R\cos(\omega_2 t - \theta_1) + (\alpha_{r0} + \alpha_{\omega_{20}})(\text{DC component}) \quad [\text{Formula 10}]$$

b) When it is placed in a plane on the left side of a straight line which passes through the rotary shaft of the subturntable 9 and is parallel to the Y-axis, the total acceleration component $\alpha_T$ is given by $$\alpha_T = \omega_1^2 R\cos(\omega_2 t - \theta_1) - (\alpha_{r0} + \alpha_{\omega_{20}})(\text{DC component}) \quad [\text{Formula 11}]$$

As seen from the above formulae, even if the center of gravity on the sensitivity axis of the acceleration sensor is set at any eccentric position, the eccentricity exerts on the output signal of the acceleration sensor in that the DC component is additionally contained in the output signal of the acceleration sensor. From this fact, it is readily seen that the effect by the eccentricity can be made to be negligible by removing the DC component of the sensor output signal. The phase characteristic of the acceleration sensor can be accurately measured if the sensitivity axis of the acceleration sensor is parallel to the X-axis before the subturntable 9 is rotated. If the sensitivity axis is not perfectly coincident with the X-axis, a phase shift $\theta_1$ is created.

Figure 3:
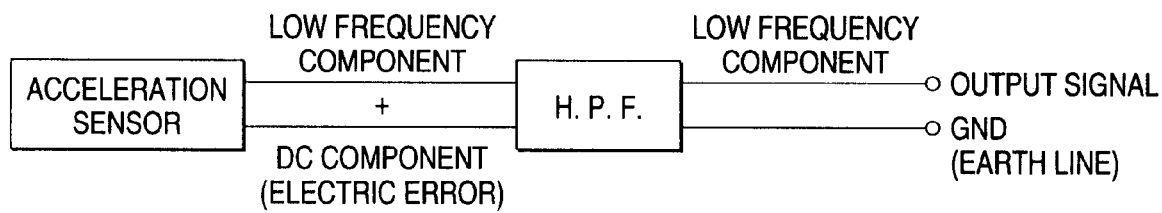
FIG. 3 is a block diagram showing a scheme to remove only a DC component from an output signal of an acceleration sensor.

Only the DC component may be removed from the output signal of the acceleration sensor as shown in block form in FIG. 3. In this instance, a high-pass filter (H.P.F) is used for removing the DC component.

The discussion described above is constructed on the basis of the fact that the sensitivity axial direction of the acceleration sensor can be set to be substantially parallel to the X-axis although the eccentric position vector is generally unknown.

The relationship between a position where the center of gravity on the sensitivity axis of the acceleration sensor is located and the output signal of the sensor was simulated on the basis of the analysis discussed above, and the results of the simulation are given below.

<Conditions>

| | |
|---|---|
| Radius of rotation R | 0.2 m |
| Quantity of eccentricity r | 0.0008 m |
| Angular velocity $\Omega_1$ of the main turntable 1 | 7.00 rad/s |
| Angular velocity $\Omega_2$ of the subturntable 9 | 125.7 rad/s (20 Hz) |

An acceleration generated by rotation of the main turntable 1 under the above conditions is 1G.

The quantity of eccentricity is one of the quantities of eccentricity of the torque balance type acceleration sensor (this value varies depending on the type of the acceleration sensor.).

<Symbols in the Drawings>

$\alpha_R$: magnitude of an acceleration acting on the vector $\vec{R}$ by rotation of the main turntable 1

$\alpha_r$: magnitude of an acceleration acting on the vector $\vec{r}$ by rotation of the main turntable 1

$\alpha\omega_2$: magnitude of an acceleration acting on the vector $\vec{r}$ by rotation of the subturntable 9

$\alpha_{R0}$: component of $\alpha_R$ in the sensitivity axial direction of the acceleration sensor $\alpha_{r0}$: component of $\alpha_r$ in the sensitivity axial direction of the acceleration sensor $\alpha_{\omega_{20}}$: component of $\alpha\omega_2$ in the sensitivity axial direction of the acceleration sensor $\alpha_T$: total acceleration component in the sensitivity axial direction of the acceleration sensor.

Figure 4A:
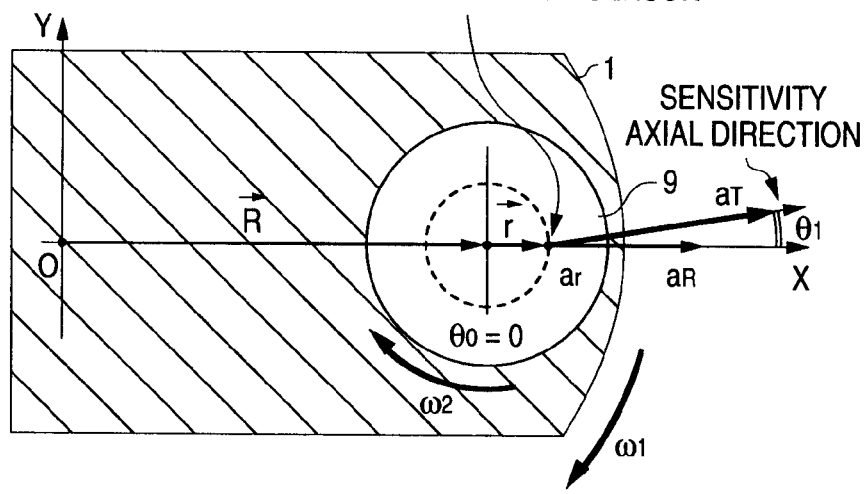
FIG. 4A is a diagram showing a center of gravity on the sensitivity axis of an acceleration sensor when $\theta_0=0$ (rad) before the subturntable rotates (where $\theta_0$: angle between an X-axis and a vector $\vec{r}$)
Figure 4B:
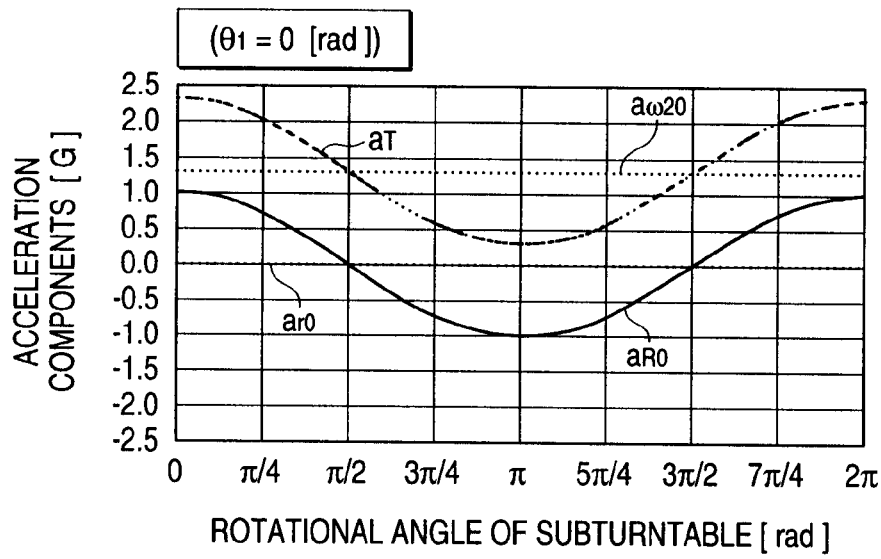
FIGS. 4B and 4C are sensor output signals when $\theta_0=0$ (rad) before the subturntable rotates.
Figure 4C:
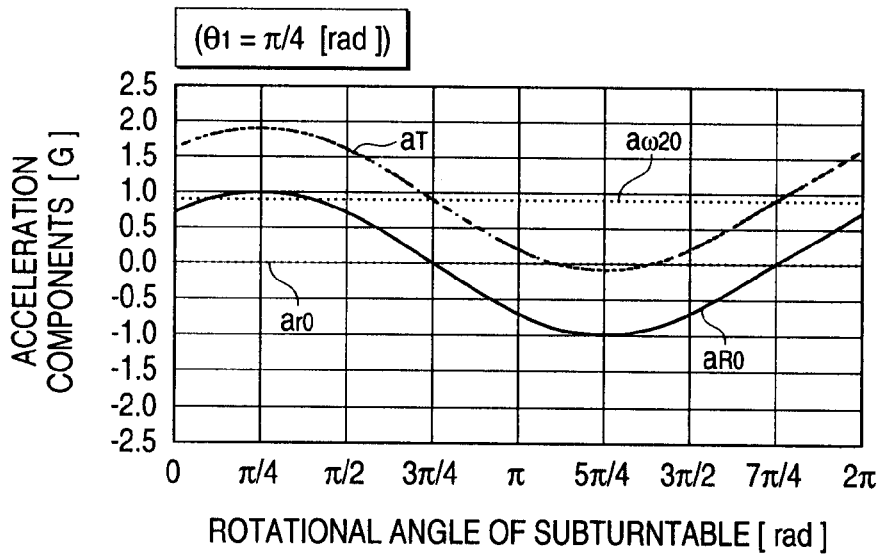

As shown in FIGS. 4A to 4C, as the eccentric angle $\theta_1$ between the sensitivity axis and the X-axis increases, a phase shift which depends on the eccentric angle $\theta_1$ is created in the output signal of the acceleration sensor. Further, the sensitivity axial direction components $\alpha_r$ and $\alpha\omega_2$ also reduce by a quantity of the eccentric angle $\theta_1$. An error of the component $\alpha_r$ is approximately 1%, and an error of the component $\alpha\omega_2$ increases in proportion to the square of an angular velocity of the subturntable 9. When the angular velocity is 20 Hz, it results in a great error factor (approximately 100% at maximum, which depends on the first eccentric position). This characteristic is retained even if the sensitivity axis of the acceleration sensor is set at any position.

Figure 5A:
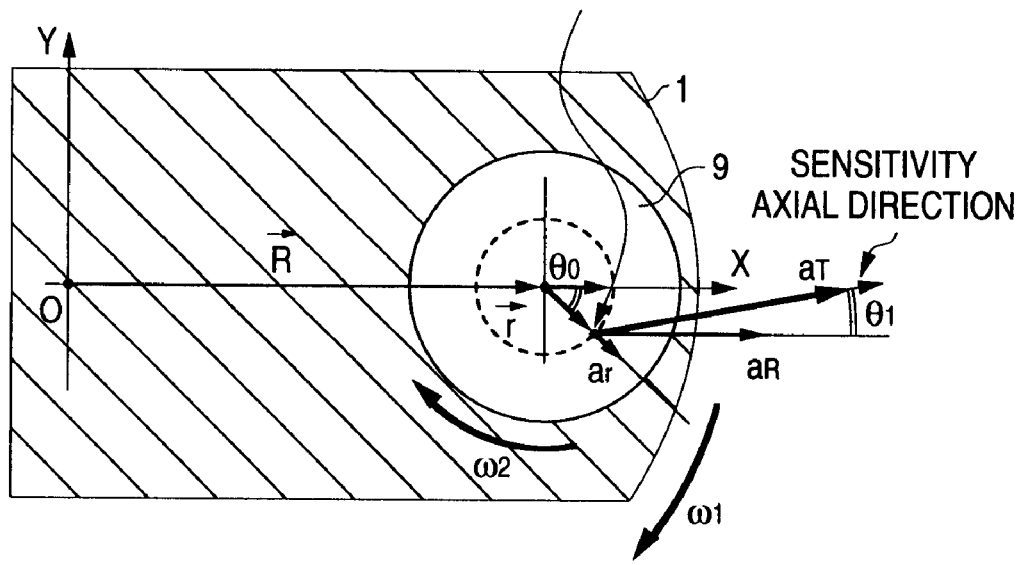
FIG. 5A is a diagram showing a center of gravity on the sensitivity axis of an acceleration sensor when $0<\theta_0<\pi/2$ (rad) before the subturntable rotates.
Figure 5B:
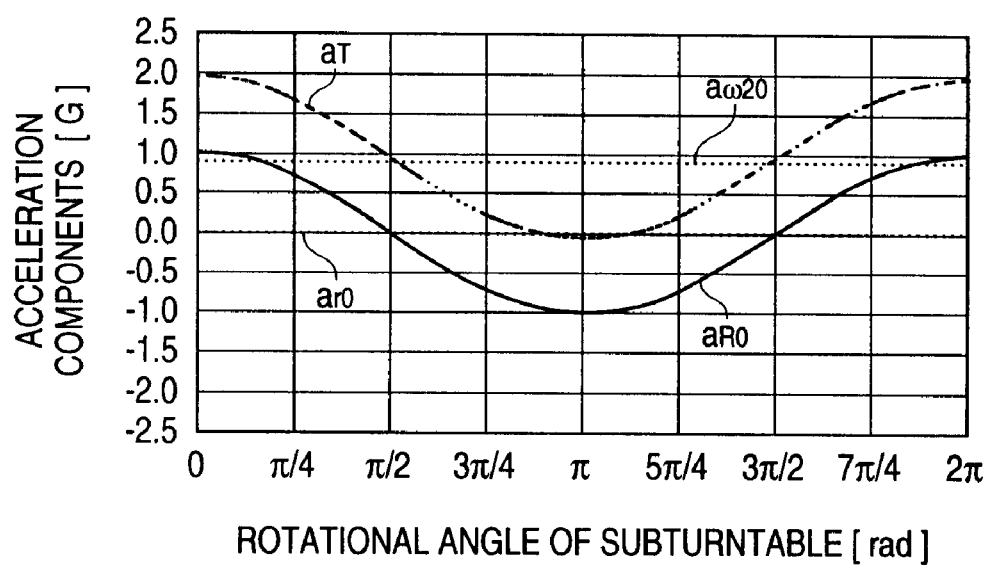
FIG. 5B is a sensor output signal when $0<\theta_0<\pi/2$ (rad) before the subturntable rotates.
Figure 6A:
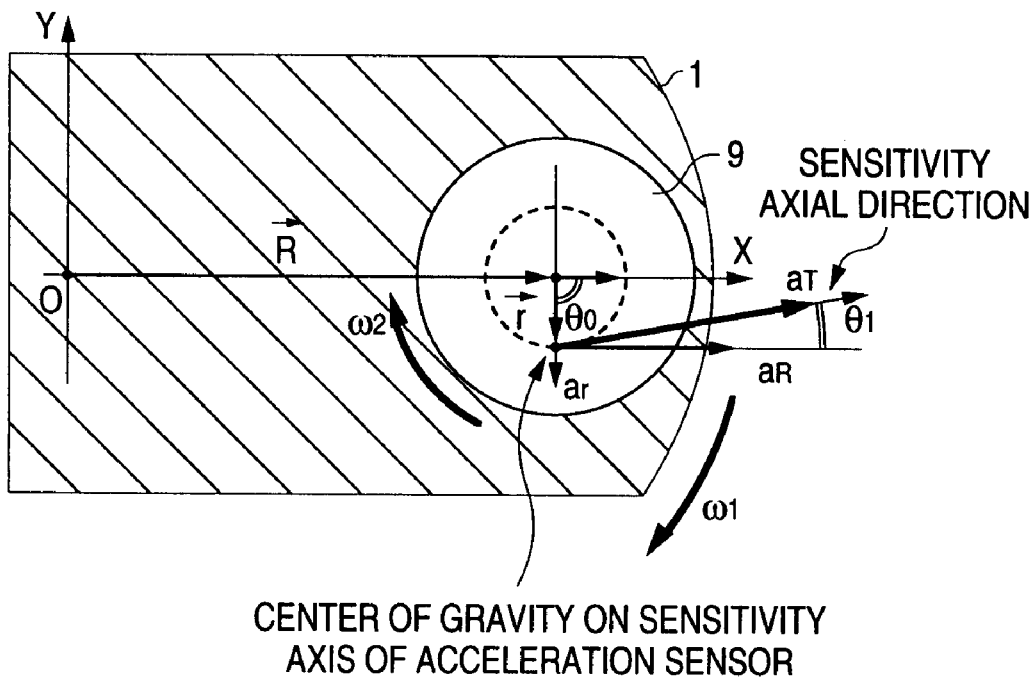
FIG. 6A is a diagram showing a center of gravity on the sensitivity axis of an acceleration sensor when $\theta_0<\pi/2$ (rad) before the subturntable rotates.
Figure 6B:
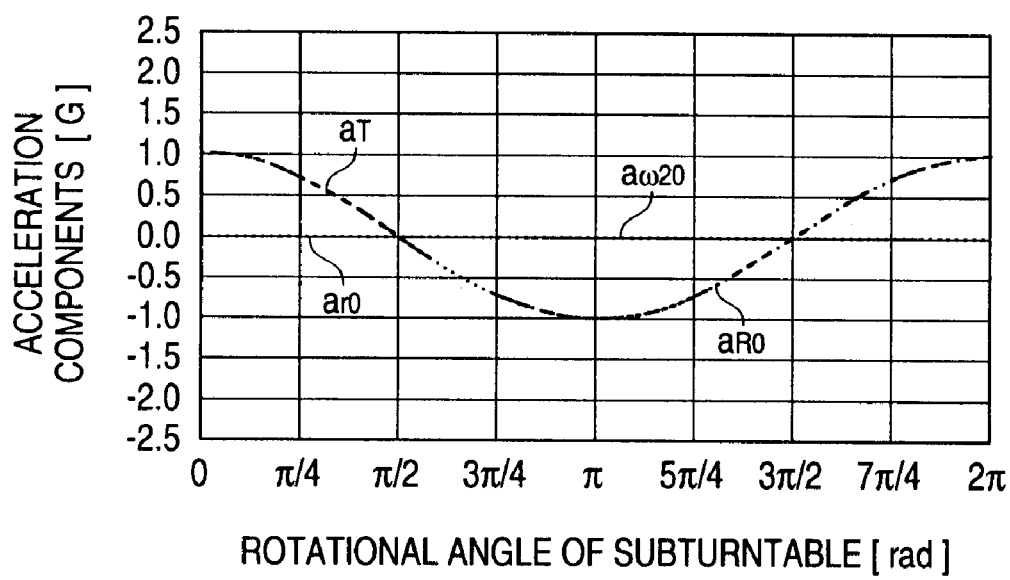
FIG. 6B is a sensor output signal when $\theta_0<\pi/2$ (rad) before the subturntable rotates.
Figure 7A:
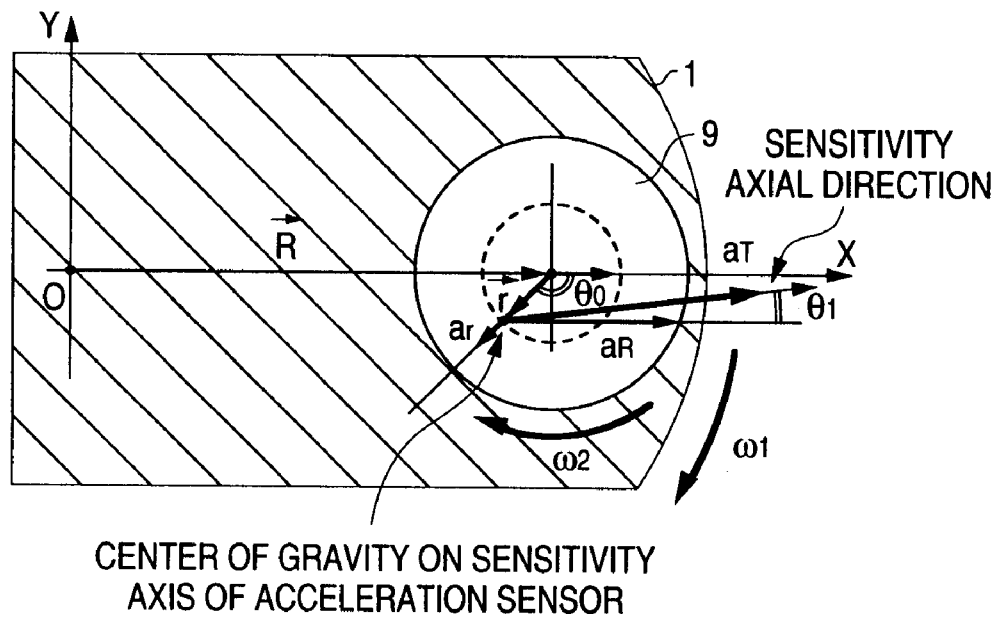
FIG. 7A is a diagram showing a center of gravity on the sensitivity axis of an acceleration sensor when $\pi/2<\theta_0<\pi$ (rad) before the subturntable rotates.
Figure 7B:
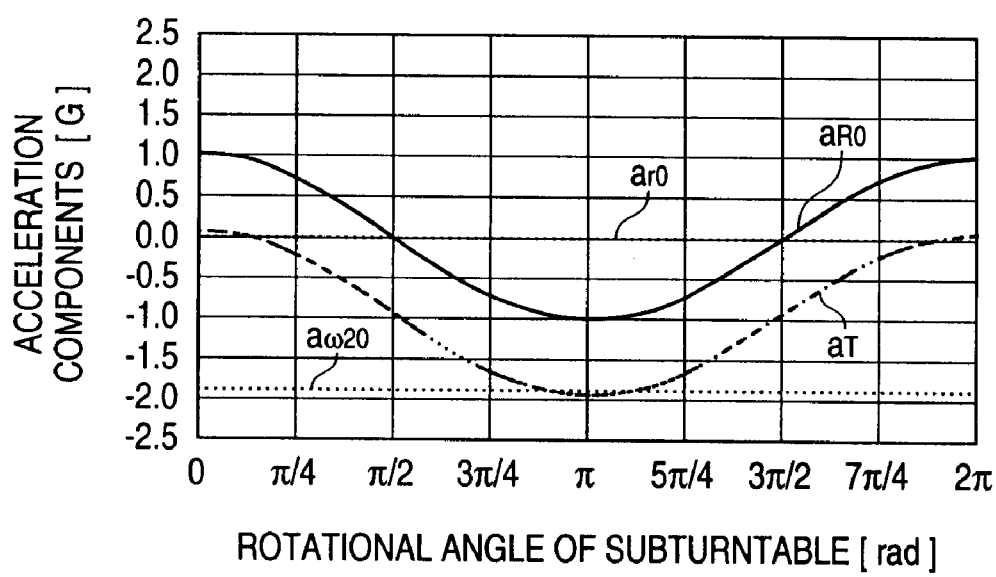
FIG. 7B is a sensor output signal when $\pi/2<\theta_0<\pi$ (rad) before the subturntable rotates.
Figure 8A:
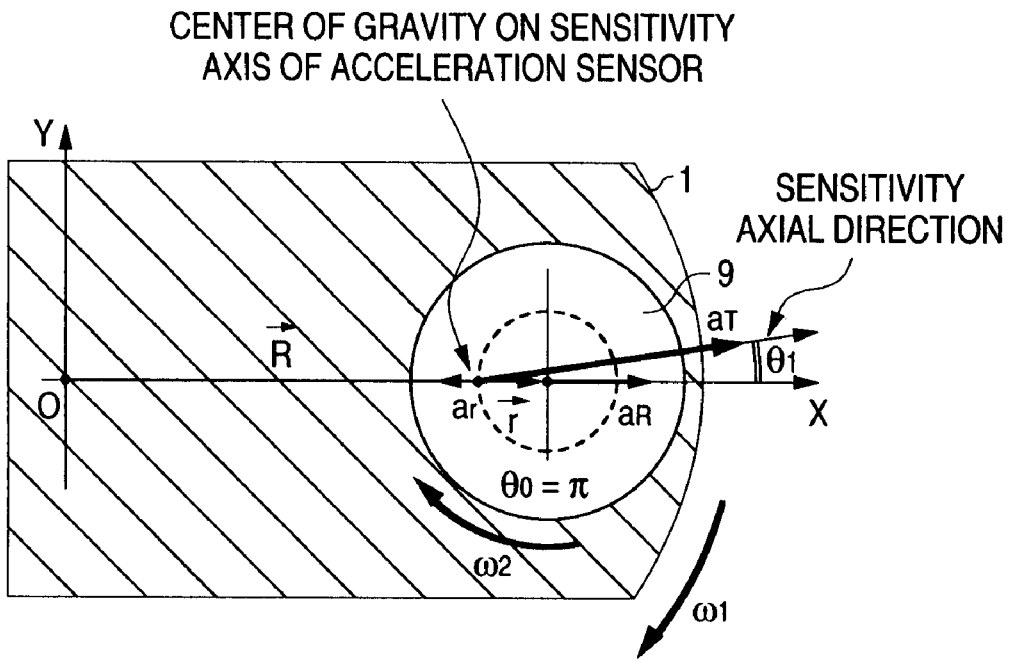
FIG. 8A is a diagram showing a center of gravity on the sensitivity axis of an acceleration sensor when $\theta_0=\pi$ (rad) before the subturntable rotates.
Figure 8B:
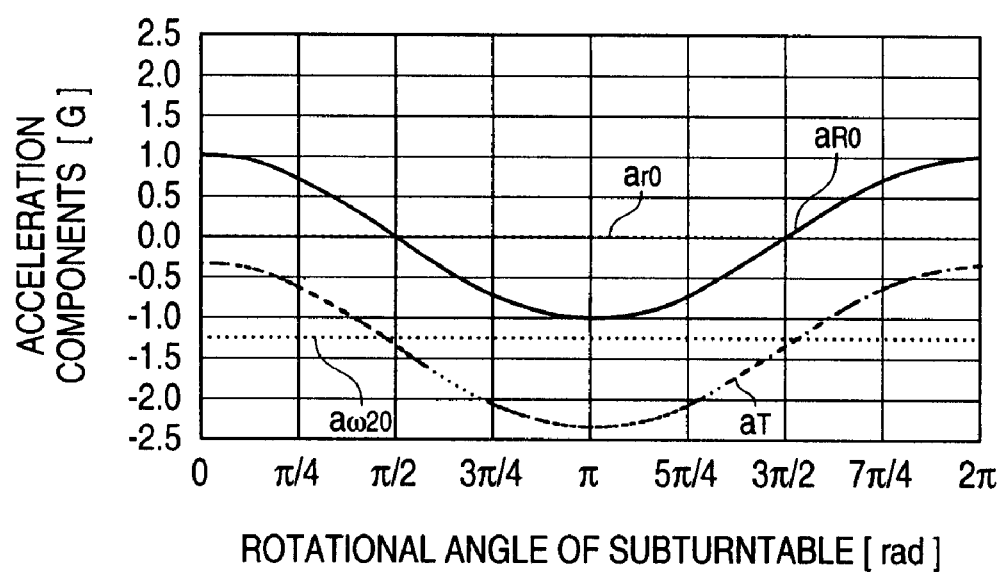
FIG. 8B is a sensor output signal when $\theta_0=\pi$ (rad) before the subturntable rotates.

For this reason, sensor output waveforms to be illustrated in FIG. 5B, and the subsequent ones are produced when $\theta_1=0$.

As seen from the foregoing discussion, even if the center of gravity on the sensitivity axis of the acceleration sensor is located at any position away from the rotational center of the small-diameter turntable or the position of the center of gravity on the sensitivity axis of the acceleration sensor is unknown, the acceleration sensor can be calibrated. Therefore, the characteristics of the acceleration sensors can be known extremely exactly.

While the embodiment mentioned above employs the turntable for the rotary member, it is evident that the rotary member may take any form other than the turntable, if it is stably rotatable.

As seen from the foregoing description, according to the present invention, it is possible to extremely exactly know the characteristics of acceleration sensors even if the center of gravity on the sensitivity axis of an acceleration sensor, which is set on a subturntable of a turntable-type acceleration generating apparatus, is located at any position away from the rotational center of the small-diameter turntable or the position of the center of gravity on the sensitivity axis of the acceleration sensor is unknown, since the invention can remove an eccentric error which will be caused by an eccentricity of the center of gravity on its sensitivity axis.

While only a certain embodiment of the invention has been specifically described herein, it will be apparent that numerous modifications may be made thereto without departing from the spirit and scope of the invention.

The present invention is based on Japanese Patent Application No. Hei. 11-10253 which is incorporated herein by reference.

What is claimed is:

1. An eccentric error corrector for a rotary-type acceleration generating apparatus including a large-diameter turntable rotated by a first servo motor and a small-diameter turntable mounted on the outer periphery portion of the large-diameter turntable and rotatable by a second servo motor, in which an acceleration sensor is attachable to the small-diameter turntable, said eccentric error corrector comprising:

a DC-component remover removing only the DC component from an output signal of the acceleration sensor attached on the small-diameter turntable.

2. The eccentric error corrector according to claim 1, wherein said DC-component remover is a high-pass filter.

3. A method for removing the effect by an eccentric error of an acceleration sensor attached to a rotary-type acceleration generating apparatus including a large-diameter turntable rotated by a first servo motor and a small-diameter turntable mounted on the outer periphery portion of the large-diameter turntable and rotatable by a second servo motor, in which the acceleration sensor is attachable to the small-diameter turntable, said method comprising the steps of:

placing an acceleration sensor as an object to be inspected on the small-diameter turntable; and removing a low frequency component from an output signal of the acceleration sensor placed on the small-diameter turntable when said large- and small-diameter turntables are rotated.

* * * * *